May 27, 1952  R. E. J. NORDQUIST  2,597,894
CONTAINER WEIGHING MACHINE WITH BUOYANT LIQUID WEIGHING MEDIUM
Filed Dec. 30, 1949  4 Sheets-Sheet 1
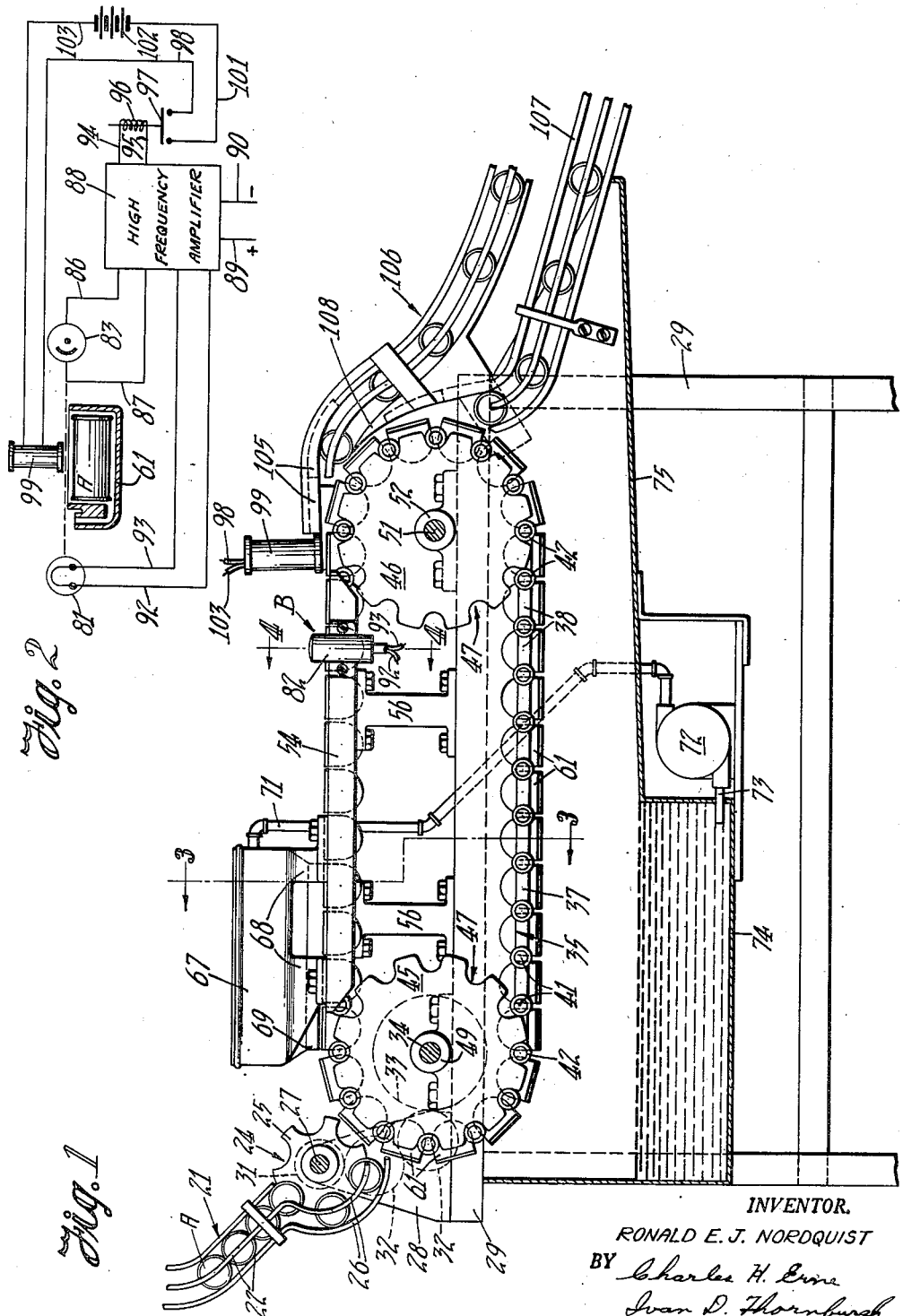
INVENTOR.
RONALD E. J. NORDQUIST
BY Charles H. Ervine
Ivan D. Thornburgh
ATTORNEYS May 27, 1952 — R. E. J. NORDQUIST — 2,597,894
CONTAINER WEIGHING MACHINE WITH BUOYANT LIQUID WEIGHING MEDIUM
Filed Dec. 30, 1949 — 4 Sheets-Sheet 2

INVENTOR.
RONALD E. J. NORDQUIST
BY Charles H. Erne
Ivan D. Thornburgh
ATTORNEYS May 27, 1952     R. E. J. NORDQUIST     2,597,894
CONTAINER WEIGHING MACHINE WITH BUOYANT LIQUID WEIGHING MEDIUM
Filed Dec. 30, 1949     4 Sheets-Sheet 3
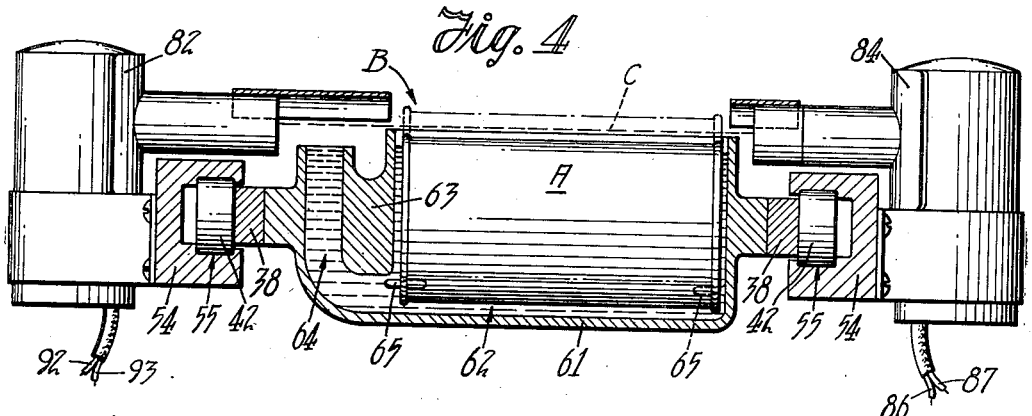
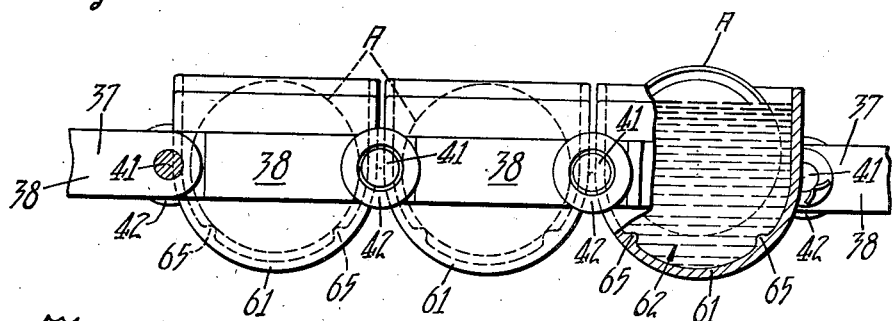
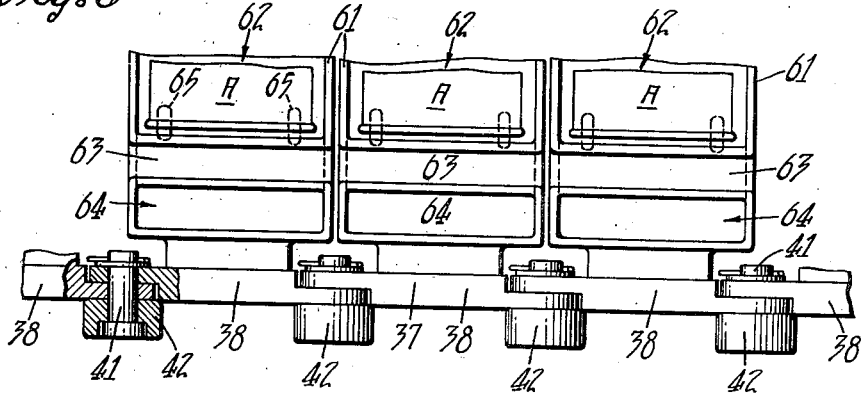
INVENTOR.
RONALD E. J. NORDQUIST
BY Charles H. Erne
Ivan D. Thornburgh
ATTORNEYS May 27, 1952 R. E. J. NORDQUIST 2,597,894
CONTAINER WEIGHING MACHINE WITH BUOYANT LIQUID WEIGHING MEDIUM
Filed Dec. 30, 1949 4 Sheets-Sheet 4

INVENTOR.
RONALD E. J. NORDQUIST
BY Charles H. Eine
Ivan D. Thornburgh
ATTORNEYS Patented May 27, 1952

2,597,894

UNITED STATES PATENT OFFICE 2,597,894

CONTAINER WEIGHING MACHINE WITH BUOYANT LIQUID WEIGHING MEDIUM

Ronald E. J. Nordquist, Maplewood, N. J., assignor to American Can Company, New York, N. Y., a corporation of New Jersey Application December 30, 1949, Serial No. 135,931

8 Claims. (Cl. 209—121)

The present invention relates generally to machines for weighing filled containers or cans and has particular reference to devices for detecting and segregating underweight cans through their buoyancy in a liquid weighing medium.

An object of the instant invention is the provision in a can weighing machine of devices wherein lightweight or underfilled cans may be readily detected and segregated from full weight cans.

Another object is the provision of such a weighing machine wherein a liquid weighing medium is used to effect rapid and accurate detection of lightweight cans through buoyancy of the cans when immersed in the liquid medium.

Another object is the provision of such a weighing machine which is simple in construction and economical in maintenance and operation and which is readily adapted to weighing cans moving in a continuous procession in spaced and timed order.

Numerous other objects and advantages of the invention will be apparent as it is better understood from the following description, which, taken in connection with the accompanying drawings, discloses a preferred embodiment thereof.

Referring to the drawings:

Figure 1 is a longitudinal sectional view of a weighing machine embodying the instant invention, with parts broken away;

Fig. 2 is a wiring diagram of the electric apparatus used in the machine;

Fig. 4 is an enlarged sectional view taken substantially along the line 4—4 in Fig. 1, with parts broken away;

Fig. 5 is an enlarged view of a portion of a bucket conveyor used in the machine, with parts broken away and parts shown in section;

Fig. 6 is a fragmentary top plan view of the conveyor shown in Fig. 5;

Figure 3:
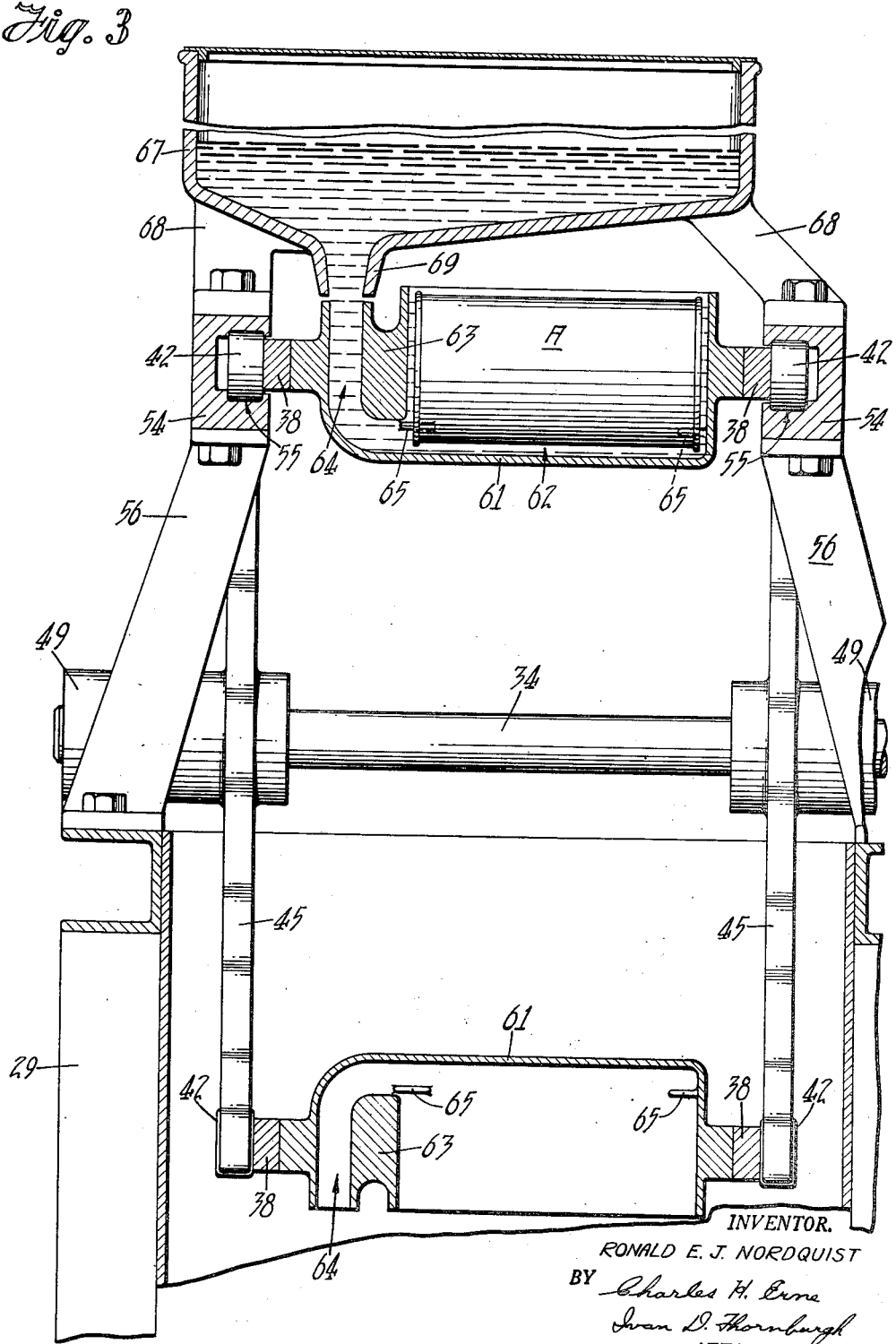
Fig. 3 is an enlarged sectional view taken substantially along the broken line 3—3 in Fig. 1, with parts broken away.

As a preferred or exemplary embodiment of the instant invention, Figures 1 to 6 inclusive of the drawings illustrate a machine for weighing filled and sealed sheet metal cans A moving in spaced and timed order in a continuous procession. As the filled cans move along a straight line path of travel they are immersed in a liquid weighing medium, for example a brine solution, and through their buoyancy in this solution are classified as sufficiently or insufficiently filled. The object of the invention as hereinbefore stated, is to detect and segregate cans which are insufficiently filled and therefore will be light in weight as compared to a properly filled can. Such a lightweight can is buoyed up by the brine solution and projects above the position of a properly filled can. Hence as the cans are conveyed subsequently through a detecting station, the lightweight cans, project abnormally above the full weight cans, and are readily detected and subsequently segregated from the full weight cans.

In the machine, the cans A to be weighed are received from any suitable source of supply, preferably by way of a runway 21 (Fig. 1) comprising a plurality of guide rails 22 disposed in proper position to guide and permit the cans to roll or slide into the machine. The cans are received from the runway 21 individually in spaced peripheral pockets 24 of a continuously rotating timing turret 25 disposed adjacent the terminal end of the runway 21 at the entrance end of the machine. Continuations 26 of the rails 22 curve around the turret adjacent its outer periphery and hold the cans in the turret pockets.

The turret 25 is mounted on a shaft 27 journaled in a pair of spaced bearing brackets 28 carried on a frame 29 which constitutes the main frame of the machine. The turret is rotated by a gear 31 which is mounted on one end of the shaft 27. The gear 31 in turn is rotated by a pair of meshing idler gears 32 mounted on short shafts carried in the bracket 28. These idler gears are driven by a gear 33 carried on an idler shaft 34 of a continuously moving weighing conveyor 35. Through this gear train the timing turret 25 is rotated in time with the conveyor 35.

The weighing conveyor 35 extends substantially the full length of the machine in a horizontal position and comprises a pair of spaced and parallel endless chains 37. The chains 37 are composed of relatively long links 38 (see Figs. 5 and 6) connected at their ends by pins 41 which carry actuating rollers 42. These conveyor chains 37 are operated in unison by a pair of spaced idler discs 45 (Fig. 1) and a pair of spaced driving discs 46, the discs being provided with peripheral notches 47 for engaging the rollers 42 and thus serving as sprockets for driving the chains.

The idler discs or sprockets 45 are located at the entrance end of the machine adjacent the timing turret 25 and are mounted on the idler shaft 34. The shaft is journaled in a pair of spaced bearing blocks 49 which are bolted to the main frame 29. The driving discs or sprockets 46 are located at the discharge end of the machine and are mounted on a main driving shaft 51 which is journaled in a pair of spaced bearing blocks 52 bolted to the main frame 29. The driving shaft 51 is the main driving shaft of the machine and may be rotated in any suitable manner.

The discs or sprockets 45, 46 are disposed in a vertical position so that the conveyor chains 37 between the sprockets operate along horizontal upper and lower runs. The chains 37 along their upper runs are supported against sagging between the sprockets 45, 46 by a pair of horizontal tracks 54 (Figs. 1, 3 and 4) having straight parallel grooves 55 in which the rollers 42 operate as they move between the sprockets. These tracks are supported on brackets 56 which are bolted to the main frame 29.

Between the conveyor chains 37, each pair of opposing links 38 of the chains, support a weighing bucket 61 (Figs. 1, 3, 4, 5 and 6). The ends of the buckets are secured, preferably by welding, to the chain links. Each bucket, as viewed in Figs. 4 and 5, are formed with straight vertical side walls and end walls, a rounded or curved bottom to fit a can, and an open top, the walls and bottom of the bucket setting off an open receptacle 62 slightly larger in inside dimensions than a can A for the reception of the can. One end of each bucket 61 is formed with a vertical partition 63 (Figs. 4, 5 and 6) which stops short of the bottom of the bucket and which sets off in the end of the bucket a liquid filling channel 64 which is open at its outer end and in communication with the can receptacle 62 at its inner end.

Hence as the conveyor 35 operates, it carries the weighing buckets 61, one secured to each opposing pair of chain links 38, in a continuous procession around the conveyor discs or sprockets 45, 46 and along the upper and lower runs of the conveyor system. As a bucket 61 travels up around the idler discs 45 it passes adjacent the timing turret 25 and this turret, advancing a can A in time with the travel of the conveyor, drops the can A into the moving bucket. Pairs of spaced lugs 65 formed on the inside of the bottom of the bucket near the ends of the can receptacle engage the end seams of the can and locate the can in the receptacle so that it is just below the top edge of the bucket and hold it away from the walls of the bucket. Continued advancement of the conveyor 35 carries the bucket 61 and the can A retained therein along the upper run of the conveyor system, the track 54 supporting the bucket and its can against sagging.

During advancement of the bucket 61 and its can A along the upper run of the conveyor the bucket is filled through its channel 64, with the liquid weighing medium. For this purpose the advancing bucket passes under a covered tank 67 (Figs. 1 and 3) which contains a supply of the liquid weighing medium. This tank 67 is disposed above the upper run of the conveyor 35 and is formed with supporting legs 68 which are bolted to the tracks 54. The bottom of the tank is formed with a depending outlet nozzle 69 which terminates close to and in alignment with the outer open ends of the channels 64 of the moving buckets 61. The liquid weighing medium preferably flows continuously from the nozzle 69. Hence as a bucket 61 passes under the nozzle, the liquid medium flows through the channel 64 into the bucket 61 and fills the can receptacle 62 to the height of the open end of the channel 64. The height of the open end of the channel 64 is disposed slightly below the top of bucket 61 to prevent overflowing of the liquid weighing medium from the bucket (see Figs. 3 and 4).

Replenishment of the liquid weighing medium in the tank 67 is effected continuously by a feed pipe 71 (Fig. 1), one end of which communicates with the tank near its top. The opposite end of the pipe communicates with a continuously driven pump 72 which is connected by a short pipe 73 to an open top reservoir 74 located below the tank 67 and under the lower run of the conveyor 35. The pump is driven in any suitable manner. The reservoir contains a large supply of the liquid weighing medium and is supported on the main frame 29. The reservoir is formed with a drip pan 75 which extends under the full length of the conveyor and connects with the reservoir to drain back into the reservoir any excess liquid medium from the buckets and the tank nozzle 69.

The liquid weighing medium filled into the bucket 61 immediately reacts on the can A carried therein in accordance with the weight of the can. If the can is properly filled it weighs a predetermined amount and remains submerged in the liquid weighing medium. However if the can is insufficiently filled, its light weight is not sufficient to hold it submerged and therefore the can will be buoyed up by the liquid weighing medium and will project above the top of the bucket. Such a buoyed up can is an abnormal or lightweight can.

Abnormal or lightweight cans A are detected in any suitable manner and are segregated from the full weight cans near the discharge end of the machine. For this purpose the conveyor 35 carries the buckets 61 while still supported by the tracks 54, past a detecting station B (Fig. 1). At this station a beam of light C (Fig. 4) is continuously projected across the path of travel of the conveyor 35 immediately above the upper edge of the buckets 61. This beam of light is supplied from a lamp 81 (Fig. 2) enclosed in a housing 82 (Fig. 4) secured to one of the tracks 54. An aperture or slit in the housing forms the light beam. On the opposite side of the conveyor, an electric eye 83 (Fig. 2) is provided to receive the beam of light. This electric eye is housed in a casing 84 (Fig. 4) which is secured to the adjacent track 54.

The electric eye 83 is connected by wires 86, 87 (Fig. 2) to a commercial or conventional high frequency amplifier 88 receiving electric current by way of wires 89, 90 leading to and from any suitable source of electric power. The lamp 81 is connected by wires 92, 93 to the power wires 89, 90 within the amplifier unit. The amplifier unit 88 includes a conventional time delay device which is connected by wires 94, 95 to an electric solenoid 96 of a normally open relay switch 97. The switch is provided with a pair of terminals, one of which is connected by a wire 98 to a normally de-energized electromagnet 99. The other terminal of the switch is connected by a wire 101 to a source of electric current 102 which in turn is connected by a wire 103 to the electromagnet 99.

The electromagnet 99 (see Fig. 1) is located adjacent the conveyor driving disc 46 at the discharge end of the machine and is disposed above and close to the upper run of the conveyor 35.

Hence, when the conveyor 35 moves a bucket 61 containing an underfilled can A, through the detector station B, the underfilled can projects above the path of travel of the beam of light C and thereby momentarily cuts off the light to the electric eye 83. The electric eye thereupon acts upon the time delay device in the amplifier unit 88 and after a predetermined period of time calculated to coincide with the passage of the abnormal can under the electromagnet 99, energizes the solenoid 96 and closes the relay switch 97. The closing of this switch immediately completes the circuit connecting with the electromagnet 99 and the magnet thereupon becomes momentarily energized and lifts and holds the underfilled can A in a raised position within its bucket 61.

As the bucket 61 continues along its path of travel it rolls or slides the raised underfilled can A along the bottom of the magnet 99 and transfers it to a closely adjacent magnetic rail 105 (Fig. 1) disposed above the path of travel of the conveyor. The electromagnet 99 thereupon becomes de-energized by an opening of the relay switch 97 so as to be ineffective on the can in the next succeeding bucket 61 unless this can is also underfilled. The magnetic rail 105 may be a permanent magnet or a permanently energized electromagnet and constitutes the entrance rail of an underfilled or abnormal can discharge chute 106. The bucket 61 propels the underfilled can A along the magnetic rail 105 until the can is fully extracted from the bucket by virtue of the bucket passing around the conveyor driving discs 46. At this point in the travel of the underfilled can, the magnetic rail 105 curves downwardly into the chute 106 and thus permits the can to roll or slide by reason of its own momentum into the discharge chute 106 which carries the can to any suitable place of deposit.

Normal or properly filled cans A which remain submerged in the buckets 61 pass under the beam of light C as the buckets move through the detecting station, and therefore have no effect on the electromagnet 99. These normal cans remain in their buckets, as the buckets pass around the upper portions of the conveyor driving discs 46 and fall from the buckets when the latter reach a position which permits the cans to roll out of them. The falling cans are caught in a normal can discharge chute 107 which keeps them segregated from the abnormal cans and which carries them to any suitable place of deposit. A curved guide rail 108 (Fig. 1) disposed adjacent the peripheries of the conveyor driving discs 46 serves as the bottom rail of the abnormal can discharge chute 106 and the entrance guide rail to the normal can discharge chute. As the buckets 61 pass around the conveyor driving discs 46, the liquid weighing medium used in the buckets, spills out onto the drain pan 75 and flows back into the reservoir 74 for re-use.

Figure 7:
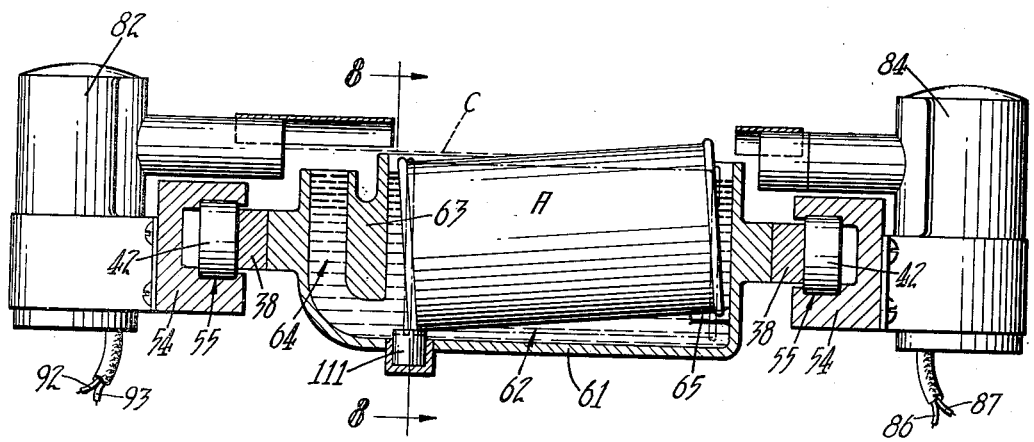
Fig. 7 is a view similar to Fig. 4 and shows a modified form of the invention.
Figure 8:
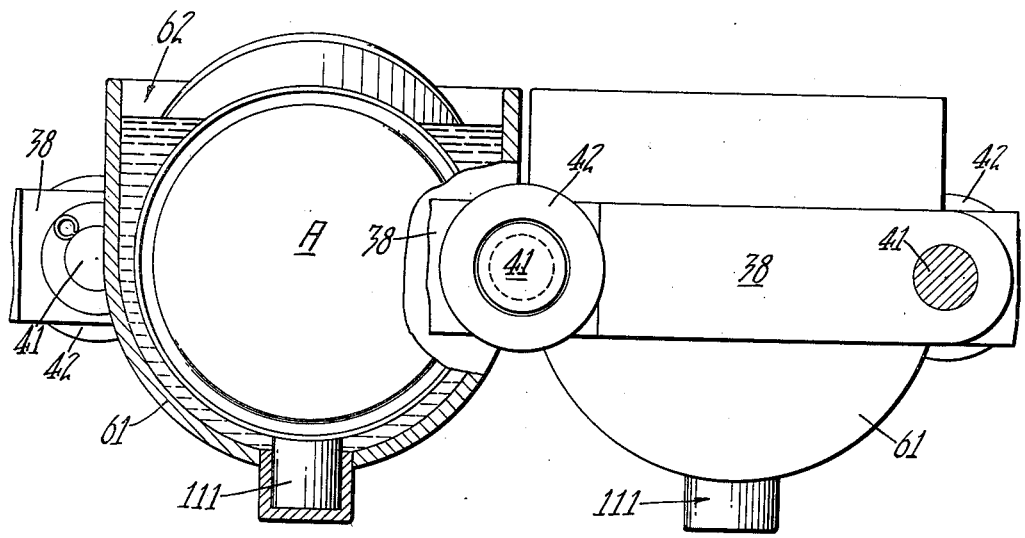
Fig. 8 is an enlarged sectional view taken substantially along the line 8—8 in Fig. 7.

As a modified form of the invention, Figs. 7 and 8 of the drawings illustrate a permanent magnet 111 secured in the bottom of the buckets 61 where it engages and holds the end seam at one end of a can deposited in a bucket. This manner of holding one end of the can increases the buoying power of the liquid weighing medium when acting on cans which are only slightly underfilled. In such cans the contents of the cans settle into the held end and leaves a greater empty space at the free end. Thus the free end projects higher above the bucket and facilitates detection by the light beam C. This is particularly an advantage in weighing cans where the degree of lightweight is only slightly below full weight.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for weighing filled and sealed containers to differentiate underfilled from properly filled containers, the combination of a conveyor including a pair of spaced chains having links, rollers carried by said links on the outside of said chains, buckets extending between and mounted on said chains, each bucket having a receptacle for holding a container, said bucket having a filling channel communicating with said receptacle, a horizontal track for said conveyor rollers for holding said buckets in a horizontal position, and means for filling each horizontal bucket through said filling channel with a liquid weighing medium for surrounding the container in said bucket receptacle, said liquid medium buoying up lightweight containers so that they project above the weighing medium to indicate their underfilled condition.

2. In a machine for weighing filled and sealed containers to differentiate underfilled from properly filled containers, the combination of an endless conveyor, spaced sprockets for supporting and for actuating said conveyor, a horizontal track for guiding one run of the conveyor between said sprockets, a plurality of buckets carried by said conveyor, each of said buckets having a receptacle for holding a container while the buckets are moving along said horizontal track, a container timing and feeding device disposed adjacent the first of said sprockets for depositing a container into the receptacle of each of said buckets as the buckets move horizontally, a tank containing a supply of liquid weighing medium disposed between said sprockets and above the path of travel of said buckets for filling each of said receptacles with said liquid weighing medium as each bucket passes said tank, whereby lightweight containers are buoyed up above the weighing medium in their receptacles to indicate their underfilled condition.

3. In a machine for weighing filled and sealed containers in liquid to segregate underfilled containers from properly filled containers by detection of their relative buoyancy, the combination of an endless conveyor having a horizontal run, a plurality of buckets carried by said conveyor and being open at the top while passing along the horizontal run of the conveyor, each bucket at that time receiving and holding a container to be weighed, means for filling said open top buckets with a liquid weighing medium to surround the container, said lightweight containers riding higher in the liquid by reason of their greater buoyancy, and means for removing said elevated containers from their buckets to segregate the underfilled and the properly filled containers.

4. In a machine for weighing filled and sealed containers to differentiate underfilled from properly filled containers, the combination of an endless conveyor having a horizontal run, means for actuating said conveyor, a plurality of buckets carried by said conveyor, each of said buckets when on the upper run of said conveyor being open at the top, means for placing a sealed container in each open top bucket, means for filling a liquid weighing medium into a bucket and around the container therein for buoying up lightweight containers so that they project further above the weighing medium to indicate their underfilled condition, means for detecting the projecting lightweight containers, and segregating means operable by said detecting means for segregating the underfilled containers from the properly filled containers.

5. In a machine for weighing filled and sealed containers to differentiate underfilled from properly filled containers, the combination of an endless conveyor, means for actuating said conveyor, a plurality of buckets carried by said conveyor, each of said buckets having a receptacle for holding a container, a supply tank located at a higher level than said buckets, said tank having an outlet disposed above the path of said buckets for discharging liquid weighing medium into each passing receptacle to surround the container therein for buoying up lightweight containers to an elevated level so that they project above the weighing medium to indicate their underfilled condition, means for retaining said filled buckets in a liquid holding position, a beam of light projected across and above the path of travel of said buckets and normally received by an electric eye disposed in alignment with said beam of light, and segregating means operated by said electric eye when said light beam is intercepted by a passing elevated lightweight container for segregating the underfilled containers from the properly filled containers as detected by said beam of light.

6. In a machine for weighing filled and sealed containers to differentiate underfilled from properly filled containers, the combination of an endless conveyor, means for actuating said conveyor, a plurality of buckets carried by said conveyor, each of said buckets having a receptacle for holding a container, said bucket also having a liquid filling channel spaced from and in communication with its container receptacle, a supply tank located at a higher level than said conveyor buckets, said tank having an outlet located above the path of travel of the bucket filling channels for discharging a liquid weighing medium into each passing bucket receptacle and around the container for buoying up lightweight containers so that they project at a higher level above the weighing medium to indicate their underfilled condition, means for detecting the projecting lightweight containers, an underfilled container discharge chute and a properly filled container discharge chute disposed adjacent the path of travel of said buckets for selectively receiving the corresponding container, and magnetic means disposed at said underfilled container discharge chute and operable by said detecting means for removing detected lightweight containers from their receptacles for placing them into said underfilled container discharge chute to segregate the underfilled containers from the properly filled and non-detected containers.

7. In a machine for weighing filled and sealed containers to differentiate underfilled from properly filled containers, the combination of a receptacle for holding a container, a liquid weighing medium disposed in said receptacle for buoying up lightweight containers so that they project above the weighing medium to indicate their underfilled condition, and means disposed in said receptacle for holding one end of the container submerged in said liquid weighing medium to facilitate projection of the free end of a lightweight container above the weighing medium.

8. In a machine for weighing filled and sealed containers to differentiate underfilled from properly filled containers the combination of a receptacle for holding a container, a liquid weighing medium disposed in said receptacle for buoying up lightweight containers so that they project above the weighing medium to indicate their underfilled condition, and magnet means disposed in said receptacle and engageable by one end of the container for holding said end submerged in said liquid weighing medium to facilitate projection of the free end of a lightweight container above the weighing medium.

RONALD E. J. NORDQUIST.

REFERENCES CITED

The following references are of record in the file of this patent:

UNITED STATES PATENTS

| Number | Name | Date |
|---|---|---|
| 529,188 | Pike | Nov. 13, 1894 |
| 1,524,928 | Hardel et al. | Feb. 3, 1925 |
| 1,572,055 | Warren | Feb. 9, 1926 |
| 2,142,920 | Rose | Jan. 3, 1939 |
| 2,176,784 | Bowden | Oct. 17, 1939 |
| 2,235,725 | Nordquest | Mar. 18, 1941 |
| 2,263,811 | Lipkin | Nov. 25, 1941 |